(12) United States Patent
Tobata

(10) Patent No.: US 6,846,019 B2
(45) Date of Patent: Jan. 25, 2005

(54) SEATBELT APPARATUS FOR VEHICLE

(75) Inventor: Hideo Tobata, Yokosuka (JP)

(73) Assignee: Nissan Motor Co., LTD, Kanagawa-Ken (JP)

( * ) Notice: Subject to any disclaimer, the term of this patent is extended or adjusted under 35 U.S.C. 154(b) by 0 days.

(21) Appl. No.: 10/694,051

(22) Filed: Oct. 28, 2003

(65) Prior Publication Data

US 2004/0084890 A1 May 6, 2004

(30) Foreign Application Priority Data

Oct. 31, 2002 (JP) ..................... P 2002-318318

(51) Int. Cl.[7] .............................................. B60R 22/36
(52) U.S. Cl. ...................................................... 280/806
(58) Field of Search ................................ 280/806, 807; 180/282; 297/475, 480

(56) References Cited

U.S. PATENT DOCUMENTS

| 5,552,986 A | 9/1996 | Omura et al. |
| 5,558,370 A | 9/1996 | Behr |
| 5,765,774 A | 6/1998 | Maekawa et al. |
| 6,374,168 B1 | 4/2002 | Fujii |
| 6,394,495 B1 | 5/2002 | Specht |

FOREIGN PATENT DOCUMENTS

| JP | 2000-177535 A | 6/2000 |
| JP | 2002-2450 A | 1/2002 |

*Primary Examiner*—Faye M. Fleming
(74) *Attorney, Agent, or Firm*—McDermott Will & Emery LLP

(57) ABSTRACT

A seatbelt apparatus includes a first pretensioner for winding a webbing to a retractor by a predetermined tension, a second pretensioner for applying a tension to the webbing in an emergency to restrain a passenger finally, a brake-pedal stroke sensor for detecting a manipulated amount of a brake pedal, a laser radar for detecting an obstacle in front of a vehicle and a first controller for controlling the tension by the first pretensioner in accordance with at least one of a tension control based on the detection data by the brake-pedal stroke sensor and another tension control based on the detection data by the laser radar. In operation, the first controller adopts the control based on the detection data by the brake-pedal stroke sensor while taking its precedence over the control based on the detection data by the laser radar. Due to this order of priority, it becomes possible to accomplish certain tension control for the webbing before a collision without affording the passenger a sense of incompatibility.

11 Claims, 12 Drawing Sheets

TENSION CONTROL ON
JUDGMENT OF BRAKING

TENSION CONTROL ON
RADAR JUDGMENT

SEATBELT APPARATUS FOR VEHICLE

BACKGROUND OF THE INVENTION

1. Field of the Invention

The present invention relates to a seatbelt apparatus for a vehicle. More particularly, the invention relates to a seatbelt apparatus which is equipped with a pretensioner for adjusting a tension of an automotive seatbelt and also adapted so as to rewind the seatbelt at a vehicle's abrupt braking or when its abnormal access to an obstacle is anticipated thereby to avoid a risk on a driver (or a passenger).

2. Description of Related Art

As the conventional seatbelt apparatus for a vehicle, Japanese Patent Application Laid-open No. 200-2450 discloses a seatbelt apparatus which does not rewind a seatbelt in a normal state but drives a motor for a pretensioner to rewind the seatbelt when an abnormality is generated in the circumference about a vehicle. Noted that the above abnormality means that it is expected that a driver's (or passenger's) own vehicle approaches the preceding vehicle abnormally by a relative speed and a distance between the own vehicle and the preceding vehicle contains, a built-in acceleration meter detects a great deceleration of the own vehicle, a slip sensor detects a slipping of the driver's own vehicle and so on.

Japanese Patent Application Laid-open No. 2000-177535 discloses another seatbelt apparatus that controls a tension of a seatbelt corresponding to a vehicle's traveling condition.

SUMMARY OF THE INVENTION

However, above-mentioned seatbelt apparatuses are often equipped with a driver's sudden deceleration (break operation) sensor or an unusual approaching sensor that calculates margin time to an advanced vehicle by a radar system, as a vehicle risk prediction detector. And when the sensors act independently each other, tension growth frequency of the seat belt will drastically be increased and will give unusual feeling to the driver.

Therefore, it is an object of the present invention to provide a seatbelt apparatus for a vehicle, which does not afford a driver a sense of incompatibility while avoiding a risk on the driver.

According to the present invention, the above-mentioned object is accomplished by a seatbelt apparatus for a vehicle, comprising: a webbing for restraining a passenger seated on a seat; a retractor for winding and rewinding the webbing; a first pretensioner for winding the webbing to the retractor by a first tension; a second pretensioner for applying a second tension to the webbing in an emergency about the vehicle to restrain the passenger; a manipulated brake detecting unit for detecting a manipulated amount of a brake pedal of the vehicle; an obstacle detecting unit for detecting an obstacle in front of the vehicle; and a control unit for controlling the first tension by the first pretensioner in accordance with at least one of a tension control based on detection data by the manipulated brake detecting unit and another tension control based on detection data by the obstacle detecting unit, wherein the control unit adopts the tension control based on the detection data by the manipulated brake detecting unit while taking precedence over the tension control based on the detection data by the obstacle detecting unit.

DETAILED DESCRIPTION OF THE PREFERRED EMBODIMENT

Referring to accompanying drawings, various embodiments of the present invention will be described below.

Figure 1:
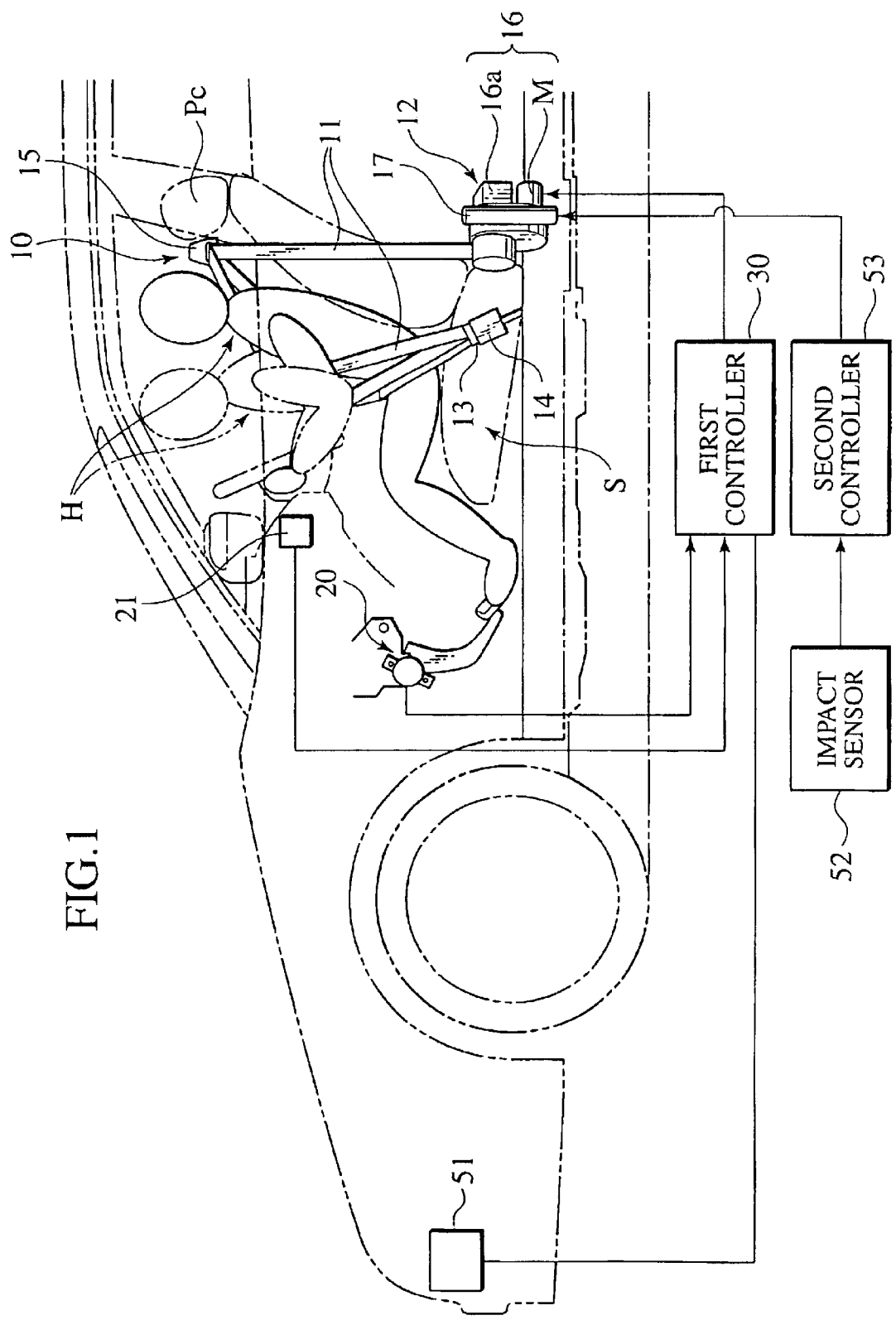
FIG. 1 is a view explaining the arrangement of constituents of a seatbelt control apparatus in accordance with an embodiment of the present invention.

FIG. 1 shows the constitution of a seatbelt apparatus of the first embodiment of the invention.

As shown in FIG. 1, a seatbelt apparatus by example of a three-point suspension passive seatbelt includes a webbing 11 for restraining a passenger H seated on a seat S and a retractor 12 for winding one side of the webbing 11. The other end of the webbing 11 is fixed to a vehicle body through an anchor (not shown) on one side of the seat S close to an automotive door. A tongue 13 is movably fitted to an intermediate portion of the webbing 11 and detachably engaged with a buckle 14 fixed to the vehicle body, on the other side of the seat S close to a body's center in the direction of width of the vehicle body. Between the buckle 14 and the above retractor 12, the webbing 11 is movably supported by a through ring 15 on the upper part of a center pillar Pc.

The retractor 12 is provided with a first pretensioner 16 for winding the webbing 11 to the retractor 12 or rewinding the webbing 11 from the retractor 12 and a second pretensioner 17 that applies a tension (i.e. the second tension of the invention) to the webbing 11 to finally restrain the passenger H if an emergency arises.

The first pretensioner 16 comprises a motor M and a reduction gear unit 16a and is adapted so as to transmit a torque as a result of reducing the revolutions of the motor M to a reel (not shown) disposed in the retractor 12 to wind the webbing 11.

In this embodiment, the second pretensioner 17 is in the form of an explosion-type pretensioner and is adapted so as to instantly wind the webbing 11 into the retractor 12 due to explosion of filling powder when detecting a collision.

Noted that the second pretensioner 17 is not limited to the explosion-type pretensioner only and may adopt a motor or the like so long as it can wind the webbing 11 rapidly.

The retractor 12 is provided with a load force limiter to prevent the passenger H from being subjected to a large burden as a result that a tension of the webbing 11 wound at a collision exceeds a predetermined value. The retractor 12 is further equipped with a locking mechanism that detects an abrupt drawing out of the webbing 11 and locks up the withdrawal of the webbing 11.

When a vehicle has a collision, the locking mechanism serves to restrain a passenger's body on the seat and simultaneously, the second pretensioner 17 acts to eliminate a slack of the webbing 11 to improve the restrictive capability for the passenger H. Further, the above load force limiter acts to keep a seatbelt force applied on the passenger's body below a predetermined value.

The seatbelt apparatus 10 of this embodiment further includes a first controller 30 for controlling the first pretensioner 16 and a second controller 53 for controlling the second pretensioner 17.

The first controller 30 controls the first pretensioner 16, based on a brake-stroke signal outputted from by a brake-pedal stroke sensor 20 (i.e. the manipulated brake detecting unit of the invention) for detecting a driver's (passenger H) manipulated amount of a brake pedal, a detection signal from a vehicle speed sensor 21 and a detection signal from a laser radar 51 (i.e. the obstacle detecting unit of the invention) installed in the front part of the vehicle to detect a distance between the passenger's vehicle and the preceding vehicle (not shown). Noted that the laser radar 51 may be replaced by a millimeter wave radar or an ultrasonic wave radar.

On the other hand, the second controller 53 controls the second pretensioner 17, based on a detection signal from a collision sensor 52 for detecting an impact at a vehicle's collision.

Figure 2:
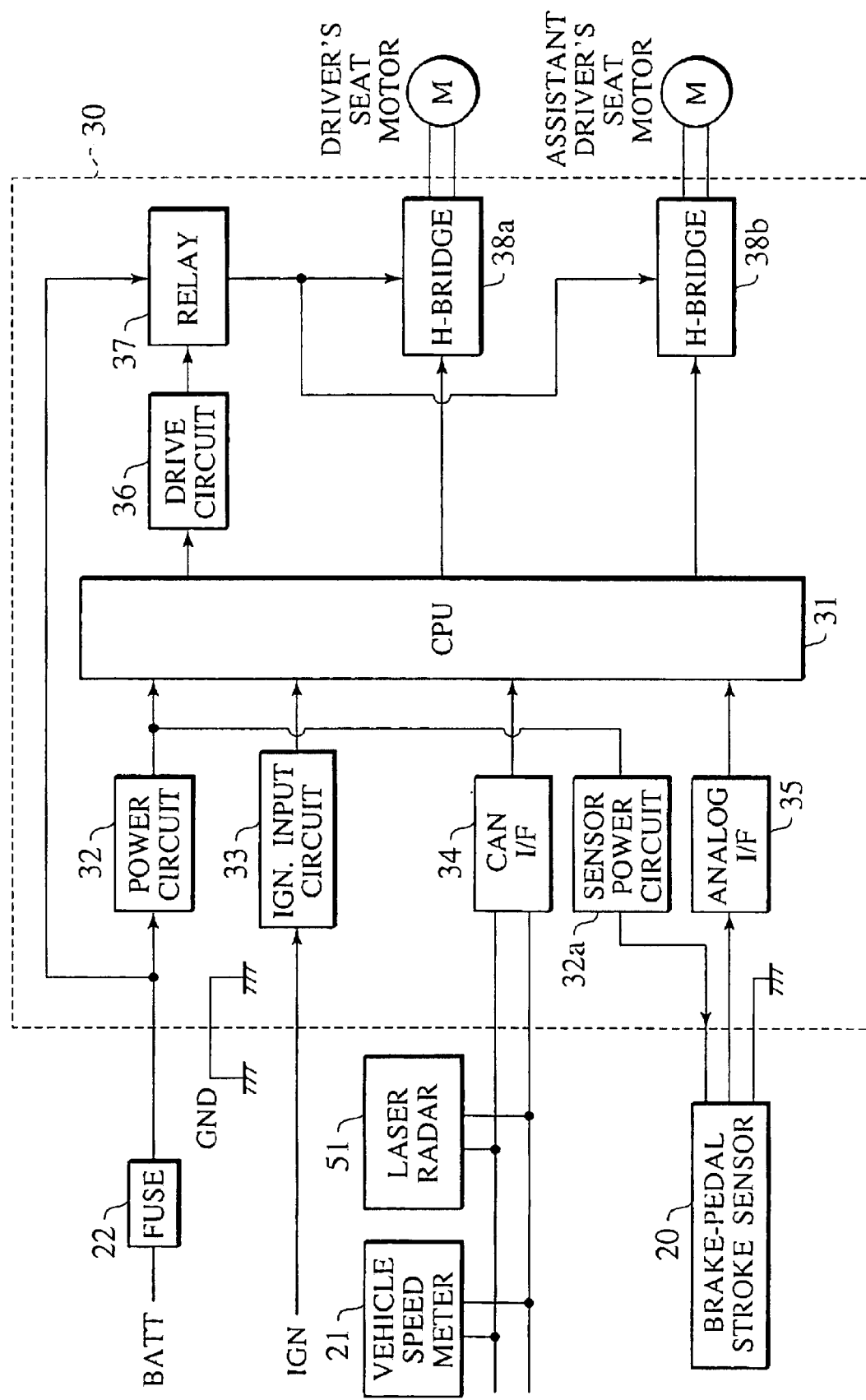
FIG. 2 is a block diagram showing the constitution of the seatbelt control apparatus in accordance with the embodiment of the present invention.

FIG. 2 shows a functional block diagram showing the detailed constitution of the first controller 30. Noted that the constitution of the second controller 53 is similar to those of the first controller 30.

As it will be understood obviously from the figure, the controller 30 is associated with two motors M for the first pretensioners 16: one motor for the seatbelt apparatus 10 for the driver's seat; and the other motor for the seatbelt apparatus 10 for the assistant driver's seat.

As shown in FIG. 2, the first controller 30 comprises a CPU (central processing unit) 31, a power circuit 32 for supplying the CPU 31 with an electrical power through a fuse 22, an IGN (ignition) input circuit 33 for inputting an ignition signal, a CAN (Controller Area Network)·I/F (interface) 34 for inputting a vehicle-speed signal from the vehicle speed sensor 21 and an Analog·I/F 35 for inputting a brake-stroke signal from the brake-pedal stroke sensor 20.

Noted that a voltage stabilized by the power circuit 32 is introduced to not only the CPU 31 but also the brake-pedal stroke sensor 20 through a sensor power circuit 32a.

Control signals from the CPU 31 is fed to a relay 37 through a drive circuit 36 and also fed to H-Bridges 38a, 38b for controlling the drive of the motors M and further switching the rotating directions of the motors M.

switching circuits provided in the respective motors M for the driver's seat and the assistant driver's seat.

The voltage fed from the fuse 22 to the power circuit 32 is applied to the H-Bridges 38a, 38b through the relay 37. The rotating directions of the respective motors M for the driver's seat and the assistant driver's seat are controlled by the H-Bridges 38a, 38b. Further, the rotating speeds of these motors M are controlled in accordance with respective duty ratios calculated by the CPU 35. Noted that the duty ratio will be referred as "duty", hereinafter.

The brake-pedal stroke sensor 20 can detect a driver's stepping amount on the brake pedal to be manipulated by a driver by means of a rotating angle of a potentiometer. The brake-pedal stroke sensor 20 converts a power voltage supplied from a sensor power circuit 32a to a voltage corresponding to the driver's stepping amount and further outputs the voltage signal to the CPU 31 through the Analog·I/F 35.

The data about vehicle speed detected by the vehicle speed sensor 21 is inputted to the CPU 31 through the CAN·I/F (interface) 34. Otherwise, without passing through the CAN·I/F 34, the vehicle speed sensor 21 may be constructed so as to output periodic pulses with a cycle corresponding to the vehicle speed. Then, the vehicle speed can be calculated by the periodic pulses.

Based on a detection signal from the brake-pedal stroke sensor 20, the CPU 31 judges whether the present braking is an urgent braking (either soft braking or hard braking both mentioned later) or not. If the present braking is an urgent braking, then the CPU 31 judges that the driver has operated a brake pedal in order to avoid a vehicle collision and outputs command currents to the H-Bridges 38a, 38b in the form of duty ratios. In this way, the revolutions of the motors M are controlled so as to advance the winding operation of the webbings 11.

Further, the detection signal from the laser radar 51 enables calculation of a distance between a driver's vehicle and an obstacle in front of the vehicle and a relative speed therebetween. Based on these calculation data (distance and relative speed), the possibility of a vehicle's abnormal access to the obstacle is judged. If it is judged that the possibility of abnormal access is high, motor currents from the respective H-bridges 38a, 38b are duty-controlled in order to roll up the webbings 11.

For malfunctions of the respective sensors for detecting a brake-pedal stroke, a radar signal and a vehicle speed for the first controller 30, it has a fail safe function to detect the malfunctions. Thus, in accordance with this fail safe logic, the first controller 30 stops the supply of currents for the motors M.

Figure 3:
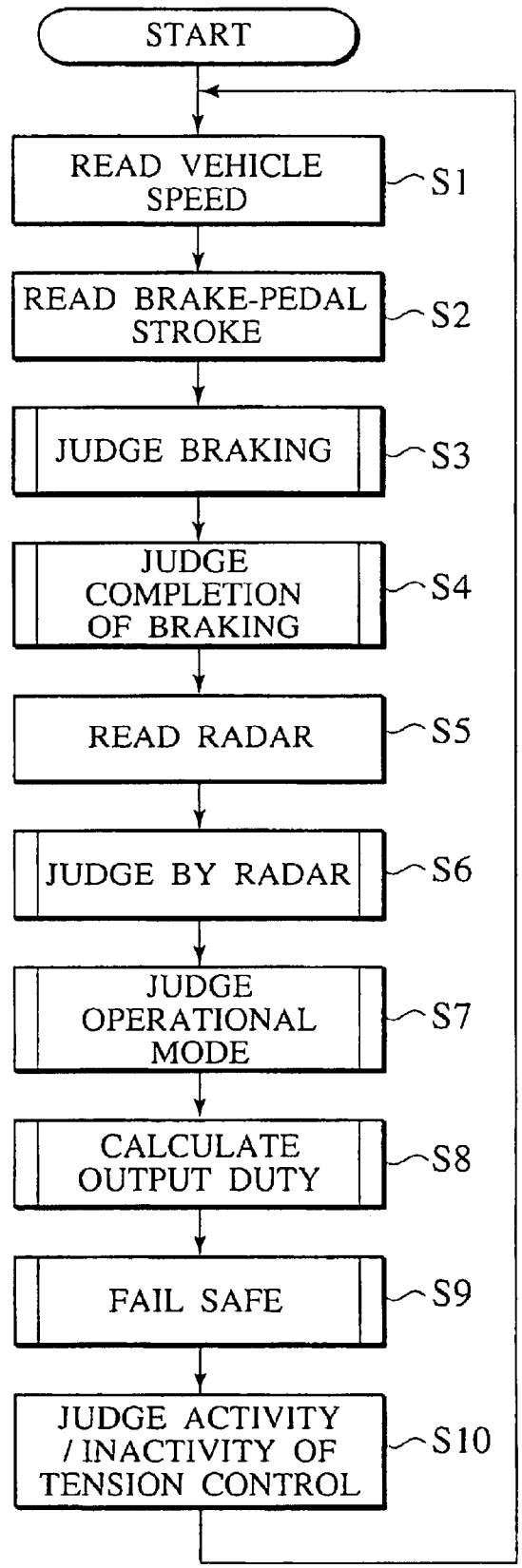
FIG. 3 is a flow chart showing the overall procedure of the seatbelt control apparatus in accordance with the embodiment of the present invention.

The operation of the seatbelt apparatus 10 of this embodiment will be described below. FIG. 3 is a flow chart showing the whole operation of the seatbelt apparatus 10 of this embodiment. FIGS. 4 to 9 show respective flow charts explaining the details of the operation.

During the vehicle's traveling, at step S1, the CPU 31 reads a traveling speed of the related vehicle detected by the vehicle speed sensor 21, through the CAN·I/F 34. Next, at step S2, the CPU 31 reads a stroke amount of the brake pedal (stepping amount) detected by the brake-pedal stroke sensor 20, through the Analog·I/F 35.

At step S3, it is executed to judge whether the vehicle is being at an urgent braking, based on so-obtained data of the vehicle speed and the stroke amount of the brake pedal. For example, if an obstacle suddenly appears in front of a vehicle during its traveling or when a driver finds out an obstacle with delay, the driver is in the habit of braking the vehicle quickly in order to avoid a vehicle collision. Therefore, the output signal of the brake-pedal stroke sensor 20 enables detection of an occurrence of urgent braking.

At step S4, it is executed to judge whether an urgent braking has been completed or not. Hereat, for example, if a vehicle is at a standstill, the vehicle speed is generally constant or a vehicle is accelerating, then it is judged that the urgent braking has been completed.

At step S5, the CPU 31 reads data about the distance between the vehicle and an obstacle detected by the laser radar 51. At next step S6, based on this detection data by the laser radar 51, it is executed to judge whether a driver's vehicle is approaching the front obstacle (e.g. a preceding vehicle) abnormally.

At step S7, based on the judgment at step S3 and the judgment at step S6, it is carried out to select an operational mode to determine the control for the seatbelt. That is, there is selected either an operational mode to control the seatbelt on a basis of the judgment of whether the vehicle is at an urgent braking or another operational mode to control the seatbelt on a basis of the distance between the vehicle and the obstacle.

At step S8, it is carried out calculate an output duty (ratio) in accordance with the so-selected operational mode.

At next step S9, it is executed in accordance with the fail safe logic to perform a process to stop supplying the motors M with voltage if judged that any one of the sensors etc. has a malfunction.

At step S10, it is executed to judge whether the seatbelt control is activated or inactivated on a basis of both fail safe and prohibitive conditions. Thereafter, the routine returns to step S1.

Figure 4:
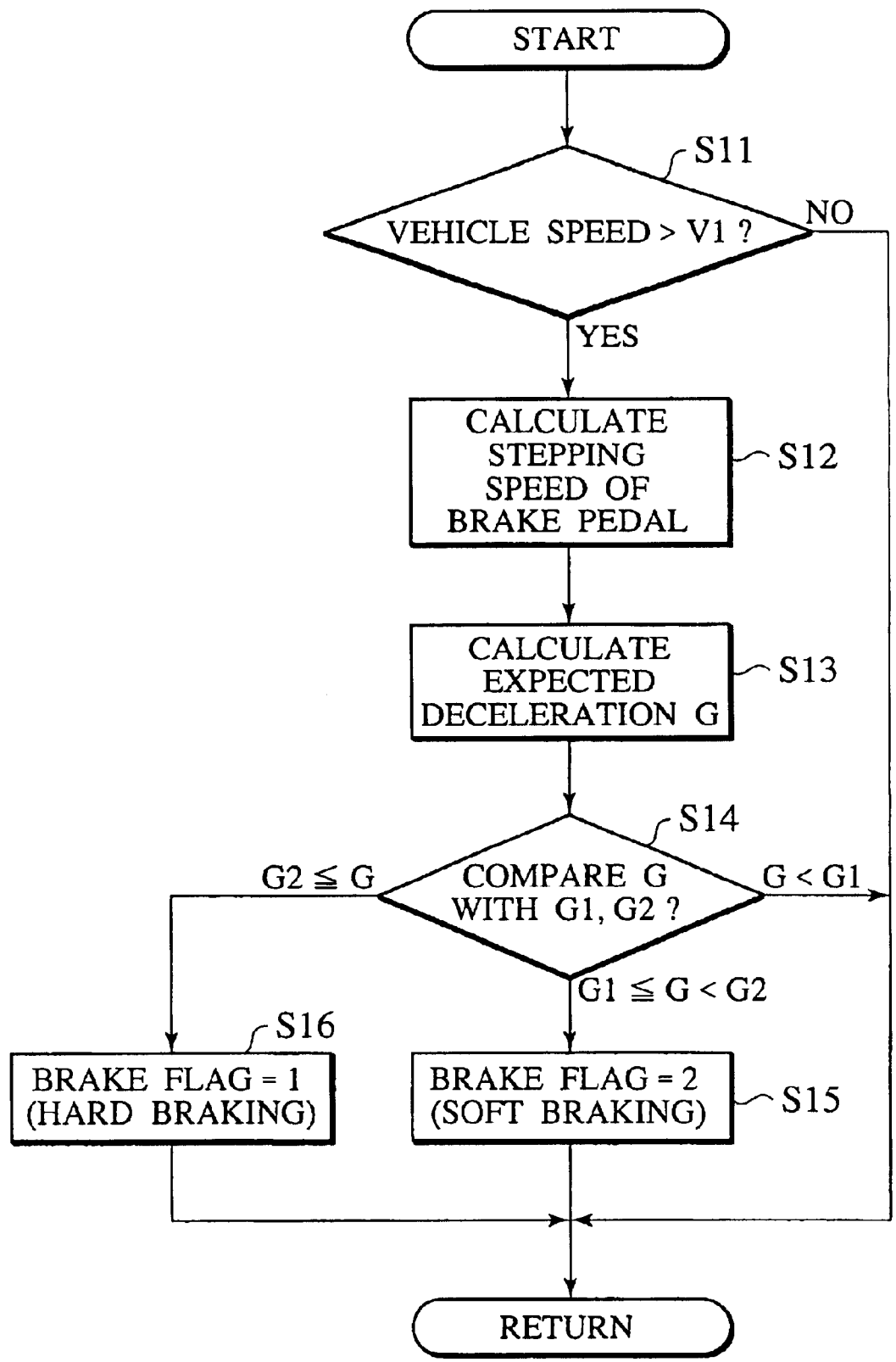
FIG. 4 is a flow chart showing the procedure of judging a braking.

FIG. 4 is a flow chart showing the detailed procedure of the above judgment of urgent braking. First, at step S11, it is executed to judge whether a traveling speed of the vehicle is more than a predetermined speed V1. If the judgment at step S11 is No, that is, the vehicle speed is equal to or less than the speed V1, then the tension control of the webbing 11 is not performed since there is no driver's manipulation to brake the vehicle in an emergency.

While, if the vehicle speed is more than the speed V1 (Yes at step S11), then the routine goes to step S12 to calculate a driver's stepping speed on the brake pedal. Noted that the driver's stepping speed can be obtained by the detection signal from the brake-pedal stroke sensor 20.

Based on the stroke amount (stepping amount) of the brake pedal and the above stepping speed of the brake pedal, at next step S13, it is executed to calculate an expected deceleration value G (negative deceleration) that is expected by the driver.

At next step S14, it is exacted to compare the expected deceleration value G with two threshold values G1, G2 (G2>G1). If the expected deceleration value G is less than the threshold value G1 (G<G1), then the routine goes to step S17 to set a braking flag of "0", so that the tension control of the webbing 11 is not carried out.

On the other hand, if the relationship of "G1≦G<G2" is established, then the routine goes to step S15 where the braking flag of "2" is set as "soft braking flag". Again, if the relationship of "G2≦G" is established, then the routine goes to step S16 where the braking flag of "1" is set as "hard braking flag".

Figure 5:
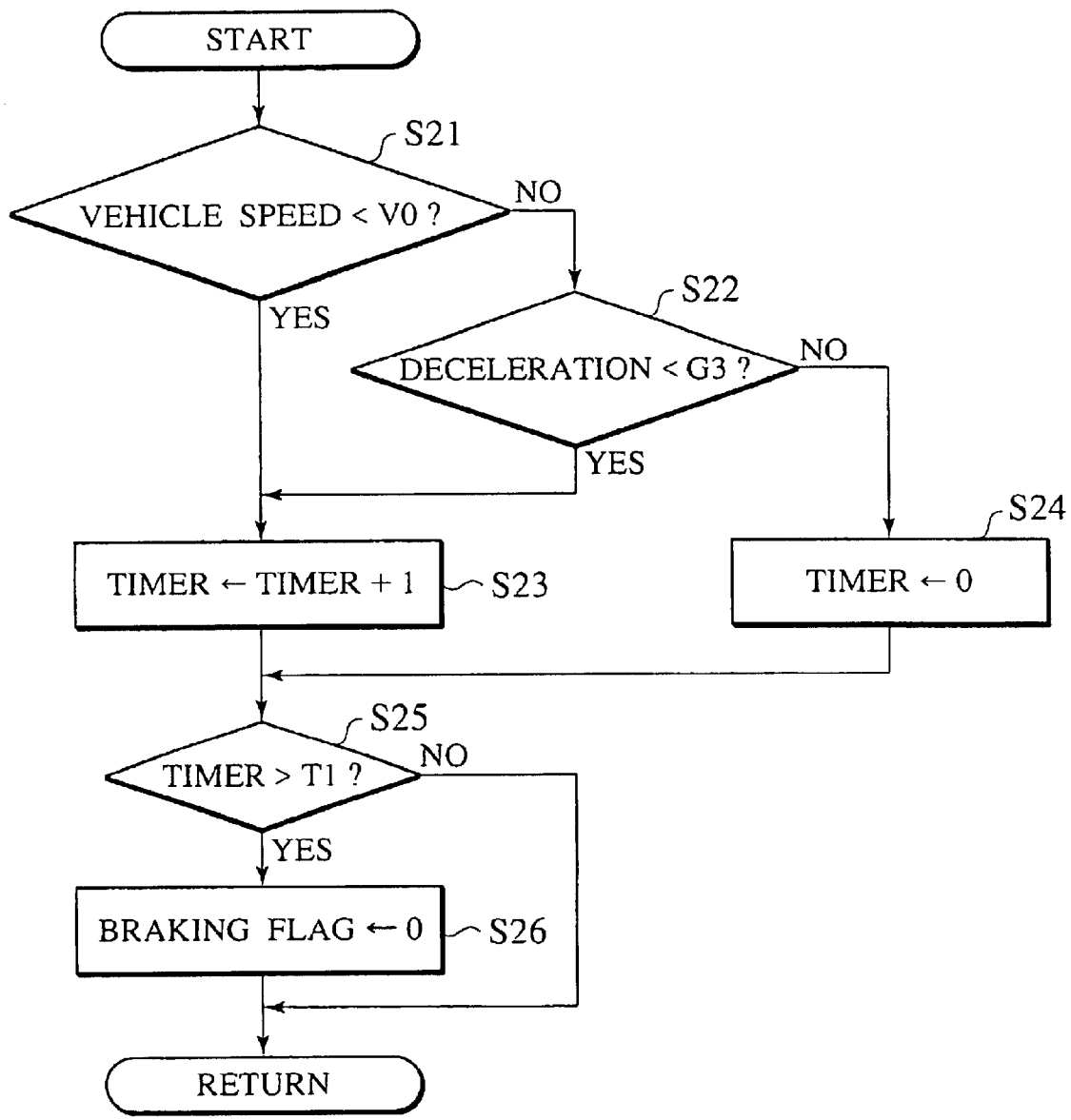
FIG. 5 is a flow chart showing the procedure of finishing the judgment of braking.

FIG. 5 is a flow chart showing the detailed procedure at step S4 of FIG. 3 to complete the judgment of urgent braking. First, at step S21, it is executed to judge whether a traveling speed of the vehicle is less than a predetermined speed V0. At step S21, if the vehicle speed is less than the speed V0 (Yes), the routine goes to step S23 to increase a variable "timer" since the vehicle is regarded as being at a standstill. On the other hand, if the judgment at step S21 is No, that is, the vehicle speed is equal to or more than the speed V0, then the routine goes to step S22 to compare the deceleration value with a predetermined deceleration G3. If the deceleration value is less than the predetermined deceleration G3, then the routine goes to step S23 to increase the variable "timer" since it is judged that the vehicle is traveling at a substantially constant speed or is accelerating.

On the other hand, if the deceleration value is more than the predetermined deceleration G3 (No at step S22), the routine goes to step S24 to reset "the timer", in other words, set the timer equal to "0".

Subsequently, at step S25, it is executed to compare the value of the variable "timer" with a predetermined value T1. If the value of the variable "timer" is more than the value T1, the routine goes to step S26 to reset the braking flag (i.e. the hard braking flag or the soft braking flag). While, if the value of the variable "timer" is equal to or less than the value T1, the braking flag is maintained as it is.

Here noted that the reason for waiting the "timer" exceeding the predetermined value T1 is as follows. That is, it is assumed that the vehicle speed may fall less than the speed V0 in a moment due to a lock on automotive tires etc. though the vehicle is not at a standstill or that the deceleration value may fall less than the deceleration G3 in a moment due to a pumping brake though the vehicle is braking. In such cases, owing to the above waiting, it becomes possible to prevent the tension control of the webbing 11 from being completed.

Figure 6:
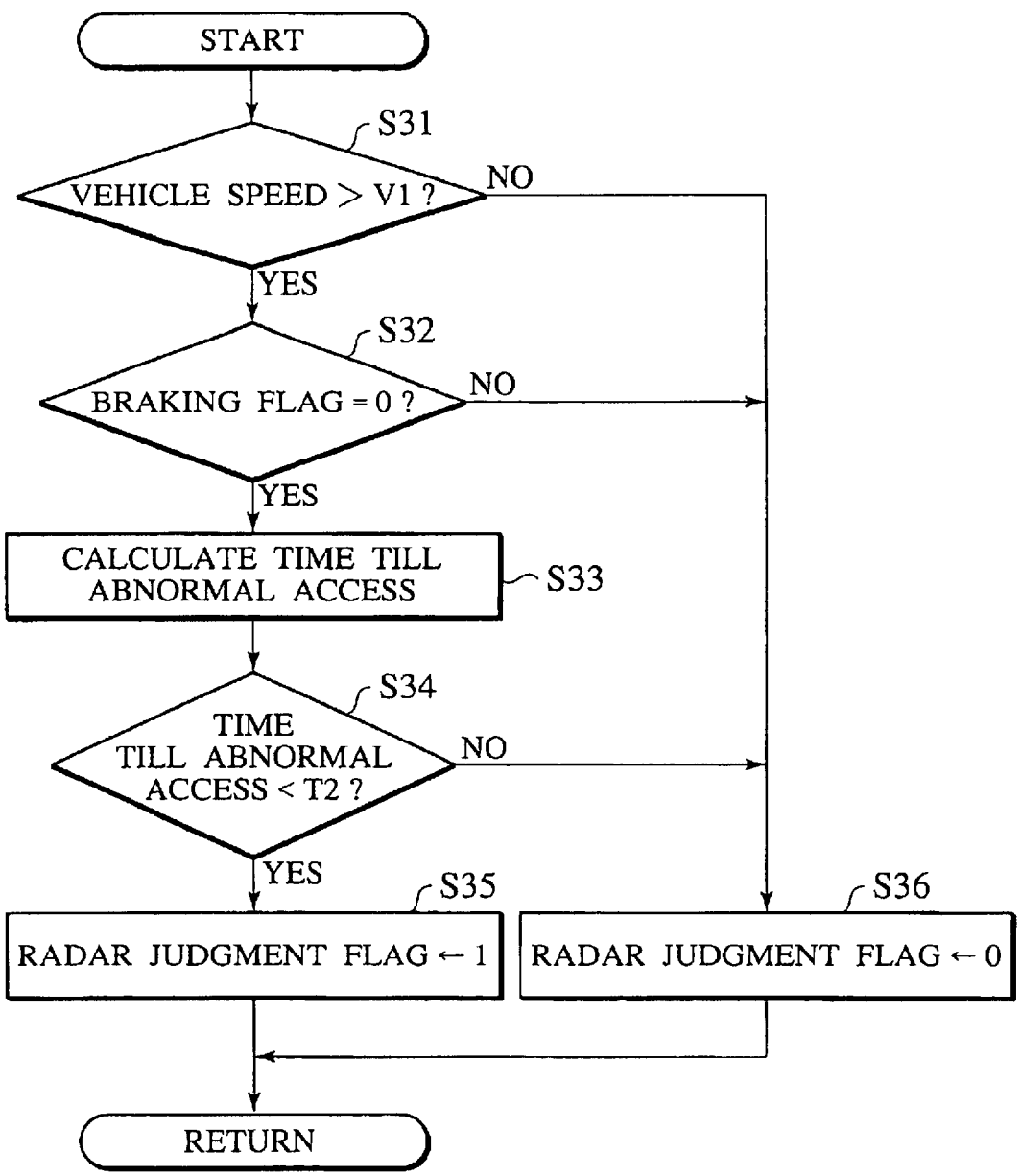
FIG. 6 is a flow chart showing the procedure of carrying out a radar judgment.

FIG. 6 is a flow chart showing the detailed procedure of the above-mentioned radar judgment at step S6 of FIG. 3. Comparing the present vehicle speed with the predetermined speed V1 at step S31, it is carried out to judge whether the vehicle speed is more than the speed V1. If the vehicle speed is equal to or less than the speed V1 (No), then the routine goes to step 36 to set a radar judgment flag of "0". That is, the tension control of the webbing 11 is not carried out.

On the other hand, when the present vehicle speed is more than the speed V1, it is executed at step S32 to judge when the braking flag established at step S3 is "0" or not. If the braking flag is not "0", that is, when the braking flag is either "1" or "2" at step S14 of FIG. 4, the routine goes to step S36 where a radar judgment flag of "0" is set.

While, if the braking flag is "0" (Yes at step S32), the routine goes to step S33. At step S33, it is executed to calculate a period from the present time till a vehicle's abnormal access to the front obstacle, based on a distance between the vehicle and the front obstacle, which is detected by the laser radar 51, and a relative speed therebetween. At next step S34, it is carried out to compare the so-obtained period (i.e. time until the abnormal access) with a predetermined time T2. If the above period is less than the time T2 (Yes at step S34), then the routine goes to step S35 to set the radar judgment flag of "1" on the judgment of impossibility to avoid the abnormal access. While, if the period is equal to or more than the time T2, the routine goes to step S36 to set the radar judgment flag of "0".

Figure 7:
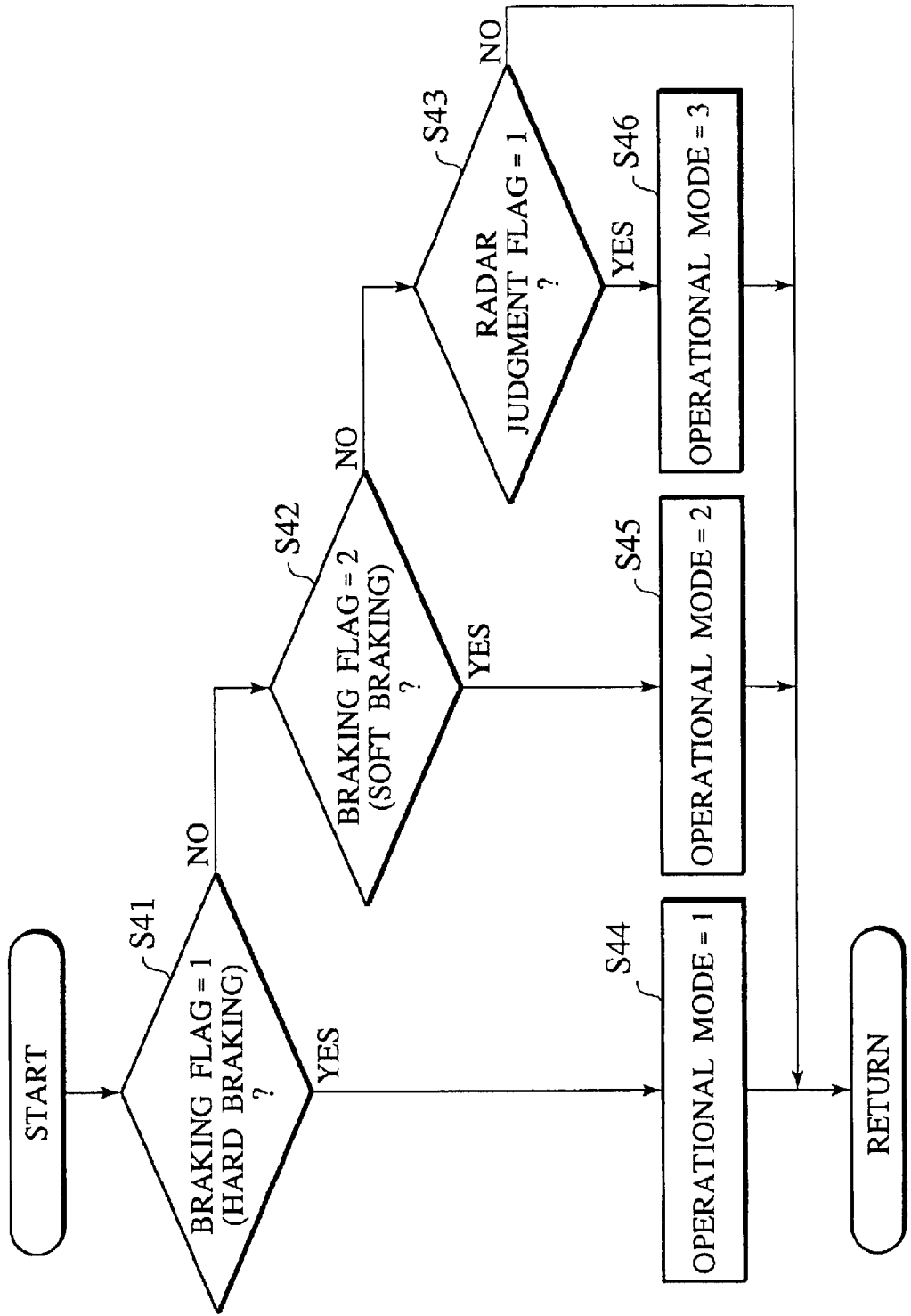
FIG. 7 is a flow chart showing the procedure of judging the operation mode.

FIG. 7 is a flow chart showing the detailed procedure of the operational mode judgment described at step S7 of FIG. 3. When the braking flag is set to "1" (i.e. case of hard braking) at step S16 of FIG. 4, the judgment at step S41 of FIG. 7 is "Yes" and then the routine goes to step S44 where the operational mode is set to "1".

While, when the braking flag is set to "2" (i.e. case of soft braking) at step S15 of FIG. 4, the judgment at step S41 of FIG. 7 is "No" and the judgment at step S42 is "Yes". Then, the routine goes to step S45 where the operational mode is set to "2". Moreover, when the radar judgment flag is set to "1" at step S35 of FIG. 6, the judgment at step S41 of FIG. 7 is "No" and the judgment at step S42 is also "No", while the judgment at step S43 is "Yes". Then, the routine goes to step S46 where the operational mode is set to "3".

Here noted that the above "operational mode" means how to control the tension of a seatbelt in rewinding it in the seatbelt apparatus, which will be described later.

Figure 8:
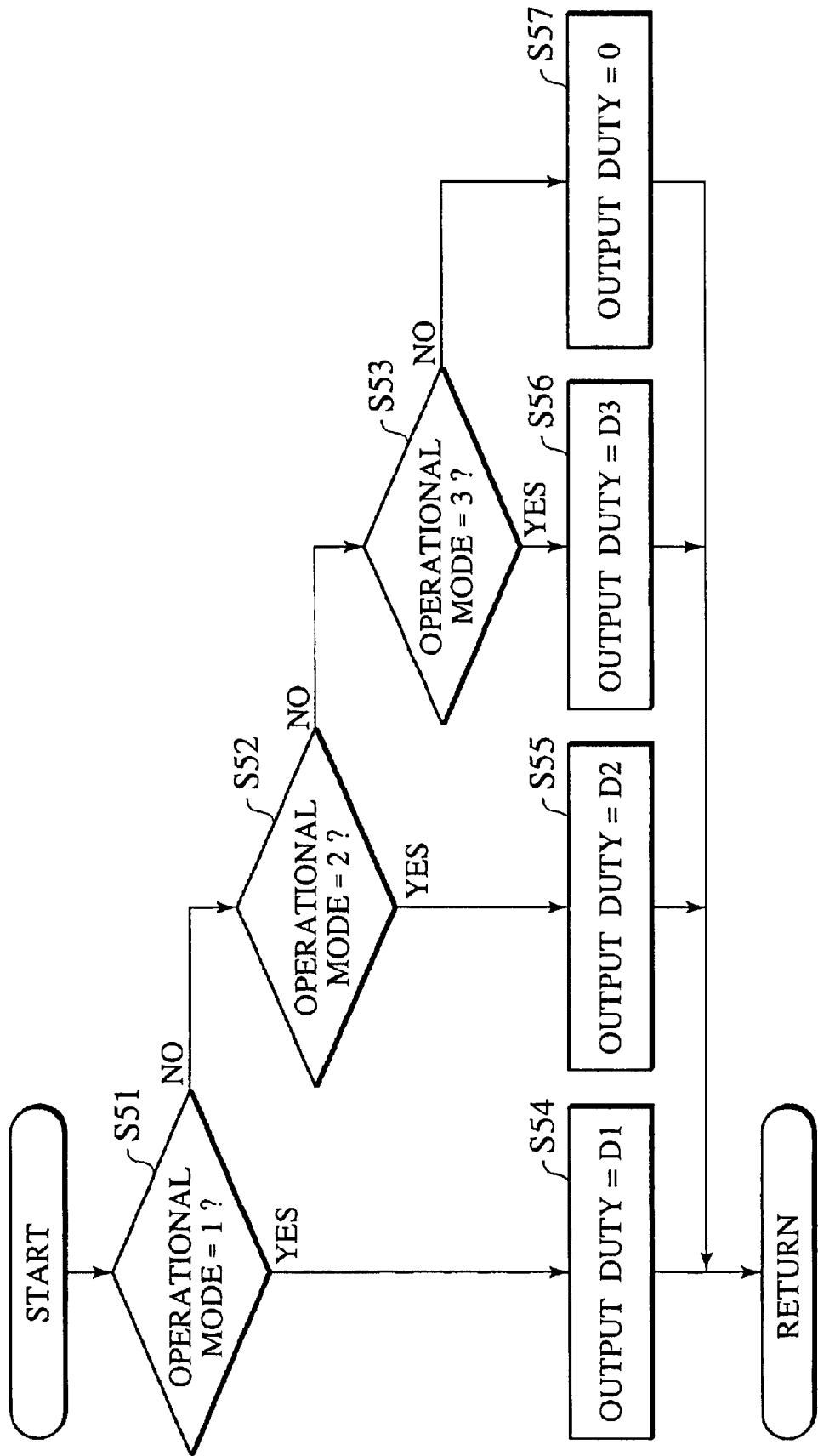
FIG. 8 is a flow chart showing the procedure of determining an output duty ratio.

FIG. 8 is a flow chart showing the detailed procedure of the calculation of "output duty" described at step S8 of FIG. 3. Here, the "output duty" (duty ratio) of pulse signals generated from the H-bridges 38a, 38b is determined on the ground of the operational mode obtained by the process of FIG. 7. In FIG. 8, if the operational mode is "1", the judgment at step S51 is "Yes" and then the routine goes to step S54 to establish the output duty of "D1".

While, if the operational mode is "2", then the judgment at step S51 is "No", while the judgment at step S52 is "Yes". Then, the routine goes to step S55 to establish the output duty of "D2". Moreover, if the operational mode is "3", then the judgments at steps S51 and S52 are together "No", while the judgment at step S53 is "Yes". Then, the routine goes to step S56 to establish the output duty of "D3". If no operational mode is established, all the judgments at steps S51, S52 and S53 become "No". Then, the routine goes to step S57 to establish the output duty of "0". That is, the tension control of the webbing 11 is not performed.

Figure 9:
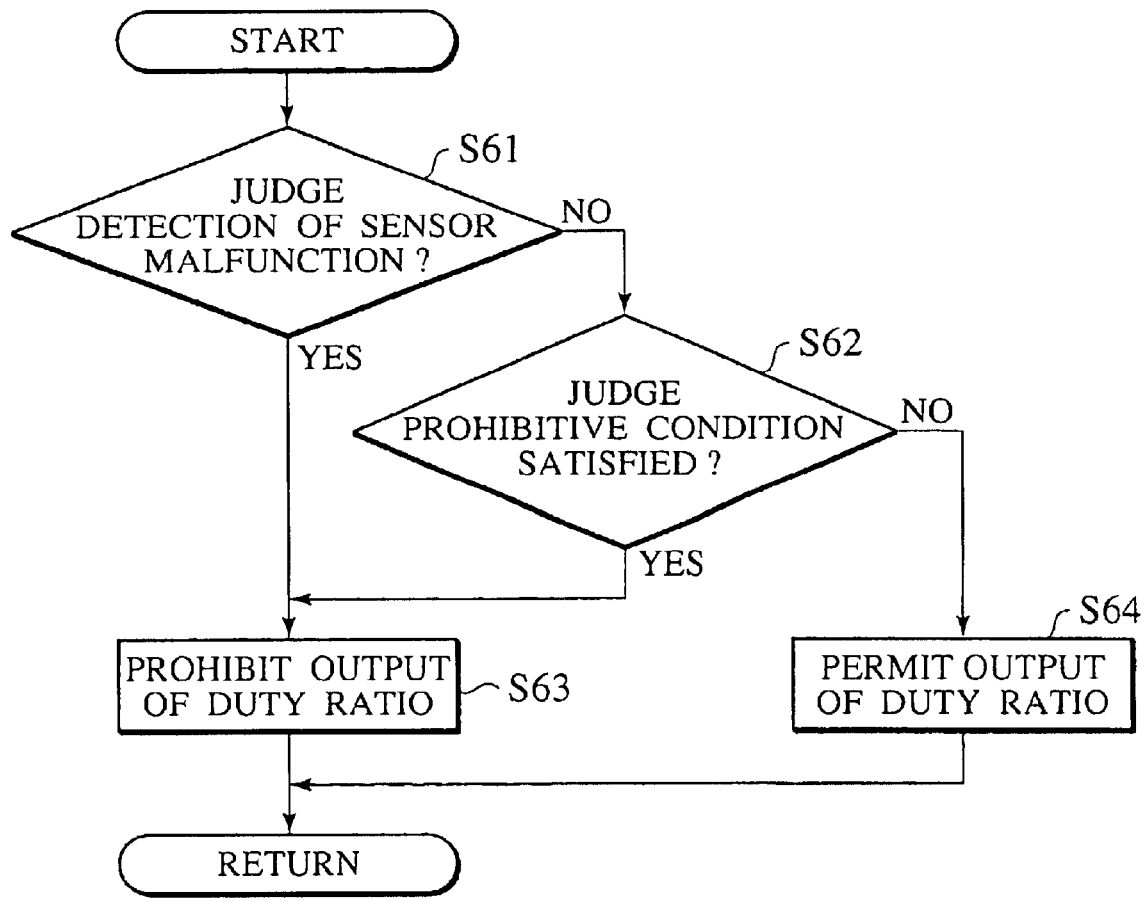
FIG. 9 is a flow chart showing the procedure of judging the admission of an output due to a fail-safe function.

FIG. 9 is a flow chart showing the detailed procedure of the fail safe operation described at step S9 of FIG. 3. First, at step S61, it is executed to judge whether a malfunction is detected in any one of the sensors etc. When the malfunction is detected, then the routine goes to step S63 to prohibit the output of duty. The background of prohibition is as follows. That is, in case of a malfunction in the sensor(s) or the like, there arises a possibility of controlling the tension of the webbing 11 in spite of no detection of either vehicle's braking or access to the front obstacle. In such a case, due to the possibility of risk on passengers, the output of duty is prohibited to avoid the occurrence of risk.

Similarly, if the prohibitive conditions are satisfied at step S62, then the routine goes to step S63 to prohibit the output of duty.

On the other hand, when no malfunction is detected and the above prohibitive conditions are not satisfied, then the routine goes to step S64 to permit the output of duty.

As shown in FIG. 6, according to this embodiment, the braking flag is confirmed in advance of the judgment of braking adopting the laser radar 51. If the judgment of braking (braking flag) is established, then the radar judgment flag becomes "0". Thus, it will be understood that the judgment of braking based on the driver's manipulation on the brake pedal takes priority of the judgment of adopting the laser radar 51.

Repeatedly, in the flow chart of FIG. 7, when the braking flag is "1" (hard braking), there is established the operational mode of "1"; when the braking flag is "2" (soft braking), there is established the operational mode of "2"; and when the radar judgment flag is "1", there is established the operational mode of "3". Further, in the flow chart of FIG. 8, when the operational mode is "1", there is established the output duty of "D1"; when the operational mode is "2", there is established the output duty of "D2"; and when the operational mode is "3", there is established the output duty of "D3". Further, there is established a relationship of D2>D3. Therefore, a belt tension in case of the judgment of braking based on the manipulation of the brake pedal becomes larger than that of the radar judgment.

Further, once the judgment of baking based on the manipulation of the brake pedal is established in spite of carrying out the control based on the radar judgment, the radar judgment flag is cleared up and transferred to the control on the judgment of braking, so that the output duty increases from D3 to D2 or D1.

Figure 10:
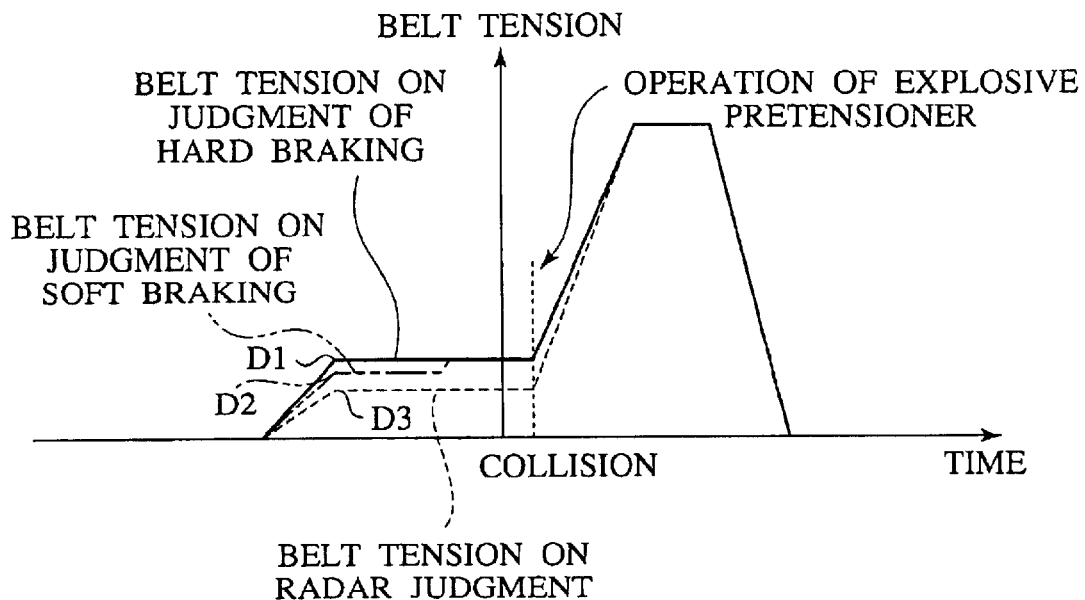
FIG. 10 is a characteristic view showing the change in belt tension based on the judgment of braking and the change in belt tension by the radar judgment.

FIG. 10 is a characteristic view showing the changes in belt tension under the tension control on the judgment of braking (hard braking and soft braking) and that on the radar judgment.

From the figure, it will be understood that respective belt tensions are flattened until a vehicle collision; nevertheless the belt tension is the largest one under the control on the judgment of hard braking, the second largest tension under the control on the judgment of soft braking, and the belt tension is the smallest one under the control on the radar judgment.

Figure 11A:
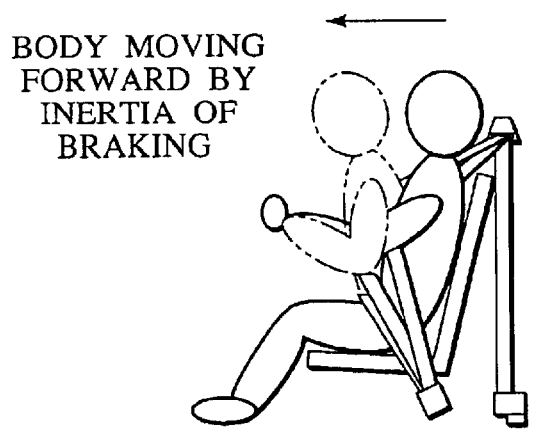
FIGS. 11A and 11B are views explaining respective movements of a passenger at the judgment of braking and also the radar judgment.
Figure 11B:
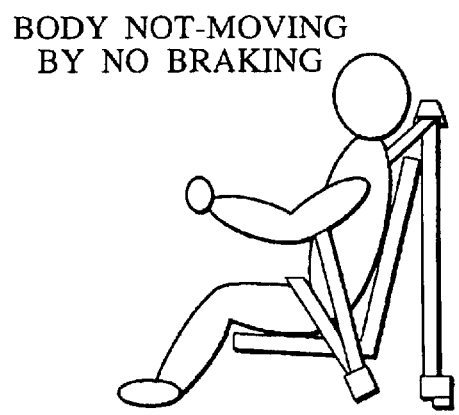

The reason of establishing the belt tension in the above way resides in that the tension control on the judgment of braking (hard braking and soft braking) requires not only a belt tension to remove a slack in seatbelt but also a force to suppress a passenger's body in opposition to its forward movement due to an inertia force by braking, as shown in FIG. 11A. To the contrary, the tension control on the radar judgment only requires a belt tension to remove a slack in seatbelt since the vehicle is not braking, as shown in FIG. 11B.

In this way, according to the seatbelt control apparatus of this embodiment, the laser radar 51 detects an obstacle in front of a driver's vehicle and if the distance between the obstacle and the vehicle becomes small, a predetermined tension is applied on the webbing 11 under the tension control on the radar judgment (i.e. control based on data obtained by the obstacle detecting unit). Further, when the brake-pedal stroke sensor 20 detects the tension control on the judgment of braking (i.e. control based on data by the brake manipulation detecting unit), another predetermined tension is applied on the webbing 11 prior to the above radar judgment. Therefore, since the webbing 11 restrains a passenger onto a seat by a constant tension while removing a slack from the webbing 11 in the previous stage to a vehicle collision, it is possible to reduce a passenger's sense of incompatibility.

Additionally, since it is established that a tension applied to the webbing 11 by the radar judgment differs from that by the judgment of braking, it is possible to apply an appropriate tension at the radar judgment and also, respectively. Further, since the tension on the judgment of braking is set larger than that on the radar judgment, it is possible to reduce a passenger's sense of incompatibility, as well. Thus, it is noted that, at the judgment of braking, a passenger is hard to feel a sense of incompatibility even if a belt tension is somewhat large. Because an inertia force is applied on the passenger due to the vehicle's decelerating and therefore, the passenger is moving forward while the driver is recognizing the braking of vehicle. On the other hand, as the radar judgment, under a situation where a passenger is seated on a passenger's seat, an abrupt application of a large belt tension would cause a passenger to feel a sense of great incompatibility. According to the embodiment, since a belt tension based on the radar judgment is small, the passenger's sense of incompatibility is moderated.

Further, since a maximum of tension applied to the webbing 11 on the radar judgment is set smaller than the maximum of tension applied to the webbing 11 on the judgment of braking, it is possible to reduce the passenger's sense of incompatibility.

Again, since a tension on the radar judgment just before a vehicle collision is set smaller than that on the judgment of braking, it is possible to accomplish the tension control with a reduced sense of incompatibility.

Next, the second embodiment of the invention will be described below. In the second embodiment, as shown in FIG. 5, the completion of braking is judged after the time T1 has passed since the establishment of releasing condition. Thus, there is produced a time delay between the judgment of braking and the releasing of belt tension intentionally. To the contrary, in accordance with the radar judgment of FIG. 6, the capability of avoiding a vehicle collision has been no sooner judged than the belt tension is released.

Figure 12:
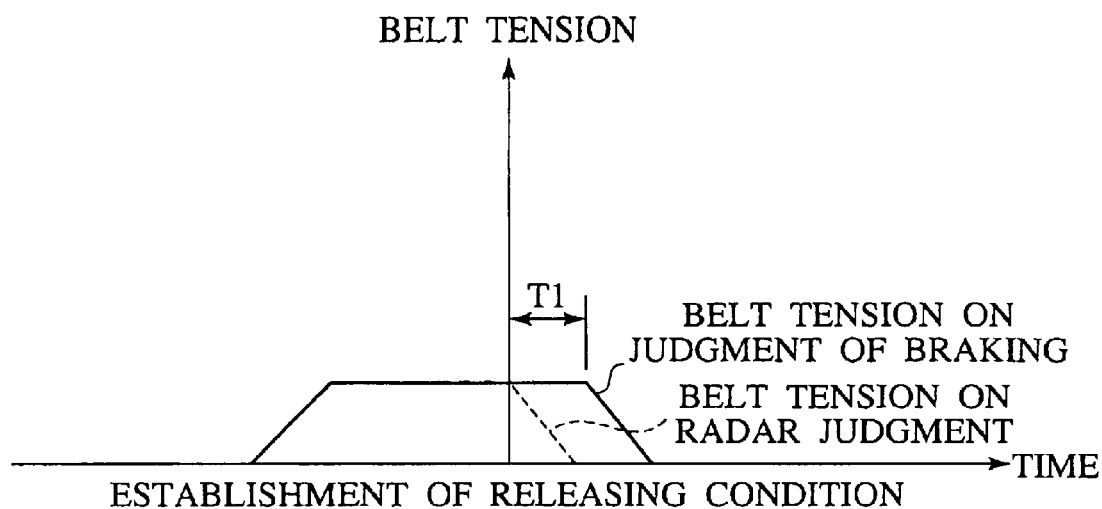
FIG. 12 is a characteristic view showing the control time by the judgment of braking and the control time by the radar judgment.

That is, as shown in FIG. 12, the belt tension due to the radar judgment is released immediately after the releasing condition has been established, while the belt tension due to the judgment of braking is released after the time Ti has passed since the establishment of the releasing condition.

The above-mentioned tension control is provided, for the vehicle's braking based on a driver's manipulation of a brake pedal, to cope with the possibility of a so-called "pumping brake" for reducing a vehicle's braking distance. In the normal pumping brake, a driver usually releases the brake pedal once and subsequently steps on it again. In process of the pumping braking, when the driver releases the brake pedal once, the belt tension is also released; nevertheless, when stepping on the brake pedal again, the control of belt tension is resumed. In such a case, the driver might have a sense of incompatibility due to the discontinuous application of belt tension. According to the second embodiment, owing to the tension control of FIG. 12, it is possible to prevent an occurrence of the above-mentioned problem of incompatibility.

Additionally, it should be noted that the increased frequency of controlling a belt tension would cause the durability of a seatbelt to be deteriorated. However, according to the second embodiment, it is possible to solve such a problem of the seatbelt in durability.

In the radar judgment, since there only exists a judgment whether a vehicle is capable of avoiding a collision with the front obstacle irrespective of a driver's manipulation, there is no need to provide a delay time for the release of tension. Even if providing a delay time in tension control based on the radar judgment, it has only to establish the delay time to be smaller than the delay time (T1) in the judgment of completing a braking based on the driver's manipulation against a brake pedal.

In this way, according to the second embodiment, since there is established tension control of the webbing 11 by the judgment of braking where the control is canceled when the deceleration of a vehicle becomes less than a predetermined value or after the predetermined time (T1) has passed since the judgment of a vehicle's standstill, it is possible to prevent an occurrence of malfunction that the tension control is suspended when a vehicle's deceleration falls in a moment due to the pumping brake or the like. That is, in case of controlling the first pretensioner on a basis of the data detected by the brake-manipulating detecting unit, since the control is canceled after a predetermined period has passed since a collision, it is possible to prevent an occurrence of malfunction that the tension control is suspended when a vehicle's deceleration falls in a moment due to the pumping brake or the like.

Figure 13:
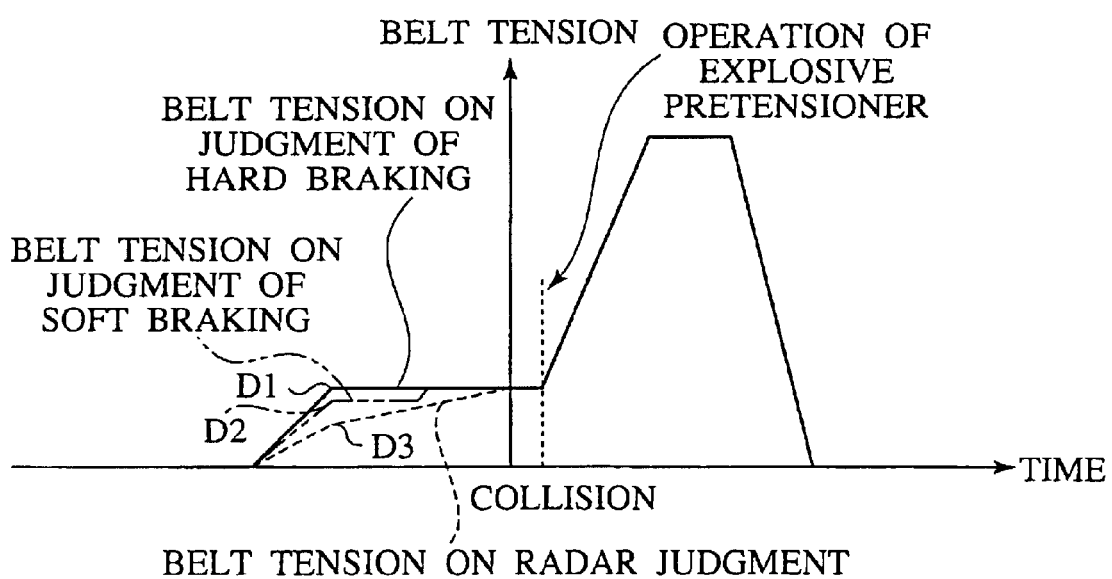
FIG. 13 is a characteristic view showing the change in webbing tension by the judgment of braking and the change in webbing tension by the radar judgment.

Next, the third embodiment of the invention will be described below. As for the establishment of output duty of FIG. 8, according to the third embodiment, the change in duty ratio in the operational mode of "3" (at the radar judgment) is established as shown in FIG. 13.

Under condition that the operational mode of "3" is set on a basis of the radar judgment and consequently the output duty of "D3" is established, the value of output duty is gradually increased so as to reach the output duty of "D1" as a constant value at a vehicle's collision. That is, the output duty of "D3" of this embodiment is not a fixed value but a variable.

The reason to provide the third embodiment is as follows. In general, since the afore-mentioned tension control based on the radar judgment is performed so as to raise the belt tension in spite of no braking a vehicle, the characteristic of raising the belt tension abruptly may allow a passenger to have a sense of incompatibility. The third embodiment of the invention is provided to cope with such a problem.

Here, it is noted that the larger a belt tension becomes, the more the restraining capability of the seatbelt apparatus against a passenger is improved after a collision. Therefore, it is desirable to elevate the belt tension at the radar judgment up to some degree until a vehicle collision.

Therefore, since the third embodiment is characterized by gradually increasing the belt tension with the passing of time, it is possible to improve the restraining performance of the apparatus against a passenger while reducing a passenger's sense of incompatibility. Additionally, since the radar judgment allows a period until a collision to be detected by means of a radar, it is possible to elevate the belt tension up to a desired value until the collision.

To the contrary, in case of the judgment of braking based on a driver's manipulating of the brake pedal, a passenger's body is moved forward due to the vehicle's braking. Therefore, even if abruptly increasing the belt tension under the above situation, the passenger's body is restrained from its forward movement, so that the passenger is hard to have a sense of incompatibility. Rather, it is desirable to raise the belt tension abruptly in view of restraining the forward movement of the passenger's body effectively.

In this way, according to the third embodiment, it is possible to take a passenger into protective custody without affording the passenger a sense of incompatibility, owing to the adoption of the constant output duty D1 at the judgment of braking based on the manipulation of a brake pedal and the variable output duty D3 at the radar judgment. That is, in case of controlling the operation of the first pretensioner under the tension control based on the detection data of the obstacle detecting unit, it is carried out to first apply a predetermined tension (as the first tension) to the webbing and thereafter, to gradually increase the tension applied to the webbing until a time when a collision is expected. Therefore, it becomes possible to take a passenger into protective custody without affording the passenger a sense of incompatibility.

Figure 14:
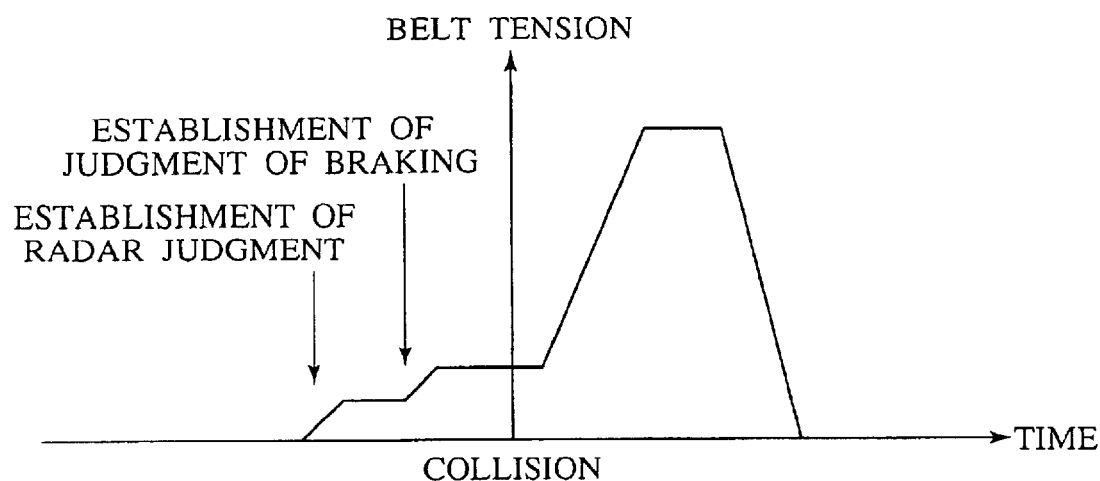
FIG. 14 is a characteristic view showing the two-stage change of a tension established by the judgment of braking and the radar judgment.

Next, the fourth embodiment of the invention will be described below. According to the fourth embodiment, the belt tension is controlled so as to change in multistage before a vehicle collision. That is, if the judgment of braking by the manipulation of a brake pedal is established on condition that the operational mode of "3" by the radar judgment has been established in FIG. 7, then the tension control on the radar judgment is shifted to the tension control on the judgment of braking by the manipulation of the brake pedal. At this time, the output duty varies from D3 to D1. Providing that the output duty D3 is less than the output duty D1, as shown in FIG. 14, the belt tension changes in two-stage since the judgment of braking is newly established before a collision.

Alternatively, by making the judgment of braking and the radar judgment in multistage, it is also possible to make the variable characteristic of the belt tension in multistage before a collision. In case of the judgment of braking in multistage, it is also possible to change the belt tension in multistage corresponding to a vehicle's deceleration expected by a driver. While, in case of the radar judgment in multistage, it is possible to change the belt tension in multistage corresponding to a time until a collision against an obstacle.

Furthermore, by combining the judgment of braking in multistage with the radar judgment in multistage and further establishing both priority and belt tension in each stage of the judgment of braking and the radar judgment, it is possible to establish the belt tension in much stage, allowing of a finer tension control. That is, since the control unit (i.e. the controller 30 of this embodiment) controls the operation of the first pretensioner 16 in a manner that the first tension applied to the webbing 11 under the tension control based on the detection data by the obstacle detecting unit (i.e. the laser radar 51) and the first tension applied to the webbing 11 under the tension control based on the detection data by the manipulated brake detecting unit (i.e. the brake-pedal stroke sensor 20) are together established in multistage, it is possible to accomplish a finer tension control.

Figure 15:
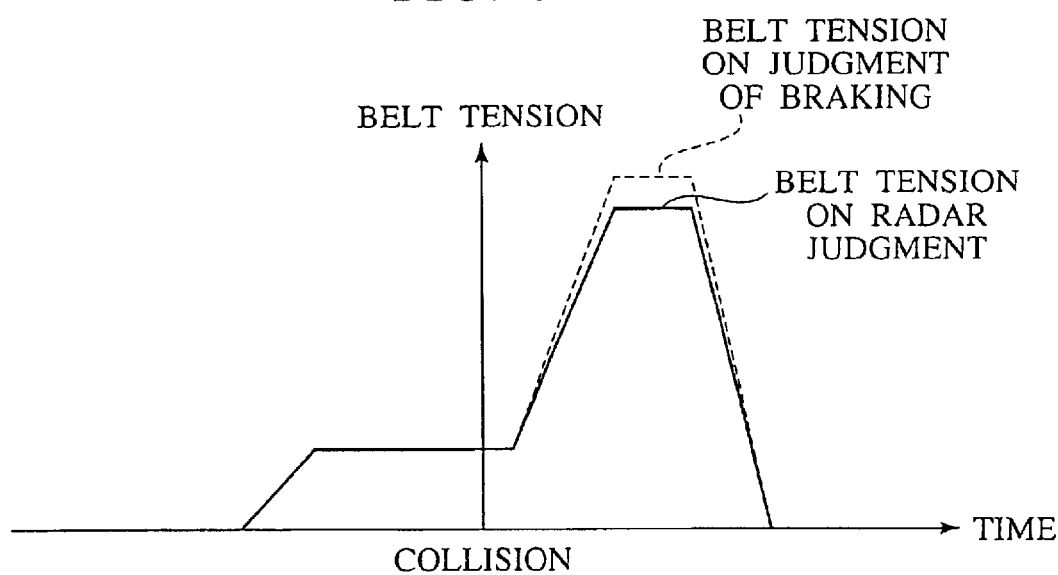
FIG. 15 is a characteristic view showing the change in tension after a collision.

Next, the fifth embodiment of the present invention will be described below. According to this embodiment, the belt tension after a collision is controlled. In the previous embodiment, the belt tension before a collision is determined as respective results of the judgment of braking and the radar judgment. Additionally, according to the fifth embodiment, the belt tension after a collision is also controlled positively, as shown in FIG. 15. Consequently, when an explosive pretensioner is operated, it is possible to provide a passenger with an appropriate belt tension.

Here, it should be noted that when a vehicle has a collision after establishing the judgment of braking, there is the possibility of a passenger's body moving forward due to a vehicle's deceleration G. Therefore, according to the embodiment, when the explosive pretensioner is operated on the establishment of the judgment of braking, the seatbelt apparatus is controlled so as to apply a high tension on a seatbelt, as shown in FIG. 15.

On the other hand, when a vehicle has a collision after establishing the radar judgment, there is no possibility of a passenger's body moving forward due to no braking. Therefore, according to the embodiment, when the explosive pretensioner is operated on the establishment of the radar judgment, the seatbelt apparatus is controlled so as to apply a normal tension (smaller than the above high tension) on a seatbelt.

In this way, according to the fifth embodiment, the tension control is performed by the judgment of braking. Thereafter, if a vehicle has a collision, the belt tension after the collision is controlled so as to get larger than the belt tension on the establishment of the radar judgment, whereby it is possible to take a passenger moving forward into protective custody certainly. That is, since the control unit of the invention (i.e. the second controller 53) controls the operation of the second pretensioner 17 in a manner that a tension applied to the webbing 11 on condition that the operation of the first pretensioner 16 has been controlled under the tension control based on the detection data by the manipulated brake detecting unit (i.e. the brake-pedal stroke sensor 20) becomes larger than the second tension applied to the webbing 11 on condition that the operation of the first pretensioner 16 has been controlled under the tension control based on the detection data by the obstacle detecting unit of the invention (i.e. the laser radar 51), it is possible to take a passenger moving forward into protective custody certainly.

Japanese Patent Application No. 2002-318318 filed on Oct. 31, 2002, is incorporated herein by reference in its entirety.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the invention as set forth in the appended claims.

What is claimed is:

1. A seatbelt apparatus for a vehicle, comprising:
   a webbing for restraining a passenger seated on a seat;
   a retractor for winding and rewinding the webbing;
   a first pretensioner for winding the webbing to the retractor by a first tension;
   a second pretensioner for applying a second tension to the webbing in an emergency about the vehicle to restrain the passenger;
   a manipulated brake detecting unit for detecting a manipulated amount of a brake pedal of the vehicle;
   an obstacle detecting unit for detecting an obstacle in front of the vehicle; and
   a control unit for controlling the first tension by the first pretensioner in accordance with at least one of a tension control based on detection data by the manipulated brake detecting unit and another tension control based on detection data by the obstacle detecting unit,
   wherein the control unit adopts the tension control based on the detection data by the manipulated brake detecting unit while taking precedence over the tension control based on the detection data by the obstacle detecting unit.

2. The seatbelt apparatus for the vehicle of claim 1, wherein the first tension applied to the webbing under the tension control based on the detection data by the obstacle detecting unit is established to be different from the first tension applied to the webbing under the tension control based on the detection data by the manipulated brake detecting unit.

3. The seatbelt apparatus for the vehicle of claim 1, wherein the first tension applied to the webbing under the tension control based on the detection data by the obstacle detecting unit is established to be smaller than the first tension applied to the webbing under the tension control based on the detection data by the manipulated brake detecting unit.

4. The seatbelt apparatus for the vehicle of claim 1, wherein a maximum of the first tension applied to the webbing under the tension control based on the detection data by the obstacle detecting unit is established to be smaller than another maximum of the first tension applied to the webbing under the tension control based on the detection data by the manipulated brake detecting unit.

5. The seatbelt apparatus for the vehicle of claim 1, wherein the first tension applied to the webbing under the tension control based on the detection data by the obstacle detecting unit is established, before a collision, to be smaller than the first tension applied to the webbing under the tension control based on the detection data by the manipulated brake detecting unit.

6. The seatbelt apparatus for the vehicle of claim 1, wherein,
- in case of controlling the operation of the first pretensioner under the tension control based on the detection data by the manipulated brake detecting unit, the control unit controls to cancel the operation of the first pretensioner after a predetermined time has passed from a collision with the obstacle; and
- in case of controlling the operation of the first pretensioner under the tension control based on the detection data by the obstacle detecting unit, the control unit controls to cancel the operation of the first pretensioner immediately after the collision with the obstacle.

7. The seatbelt apparatus for the vehicle of claim 1, wherein,
- in case of controlling the operation of the first pretensioner under the tension control based on the detection data by the obstacle detecting unit, the control unit controls the operation of the first pretensioner in a manner that a predetermined tension as the first tension is applied to the webbing firstly and subsequently, a gradually-increasing tension is continuously applied to the webbing until a time when a collision is expected.

8. The seatbelt apparatus for the vehicle of claim 1, wherein the control unit controls the operation of the first pretensioner in a manner that the first tension applied to the webbing under the tension control based on the detection data by the obstacle detecting unit and the first tension applied to the webbing under the tension control based on the detection data by the manipulated brake detecting unit are established in multistage.

9. The seatbelt apparatus for the vehicle of claim 1, wherein the control unit controls the operation of the second pretensioner in a manner that the second tension applied to the webbing on condition that the operation of the first pretensioner has been controlled under the tension control based on the detection data by the manipulated brake detecting unit becomes larger than the second tension applied to the webbing on condition that the operation of the first pretensioner has been controlled under the tension control based on the detection data by the obstacle detecting unit.

10. A seatbelt apparatus for a vehicle, comprising:
- a webbing for restraining a passenger seated on a seat;
- a retractor for winding and rewinding the webbing;
- a first pretensioner for winding the webbing to the retractor by a first tension;
- a second pretensioner for applying a second tension to the webbing in an emergency about the vehicle to restrain the passenger;
- manipulated brake detecting means for detecting a manipulated amount of a brake pedal of the vehicle;
- obstacle detecting means for detecting an obstacle in front of the vehicle; and
- control means for controlling the first tension by the first pretensioner in accordance with at least one of a tension control based on detection data by the manipulated brake detecting means and another tension control based on detection data by the obstacle detecting means, wherein the control means adopts the tension control based on the detection data by the manipulated brake detecting means while taking precedence over the tension control based on the detection data by the obstacle detecting means.

11. A method for controlling a seatbelt for a vehicle, comprising:
- preparing a webbing for restraining a passenger seated on a seat;
- detecting a manipulated amount of a brake pedal of the vehicle;
- detecting an obstacle in front of the vehicle;
- applying a first tension to the webbing in accordance with a tension control based on detection data of the manipulated amount of the brake pedal while taking precedence over another tension control based on detection data of the obstacle; and
- applying a second tension to the webbing in an emergency about the vehicle to restrain the passenger.

* * * * *